Patented Aug. 5, 1924.

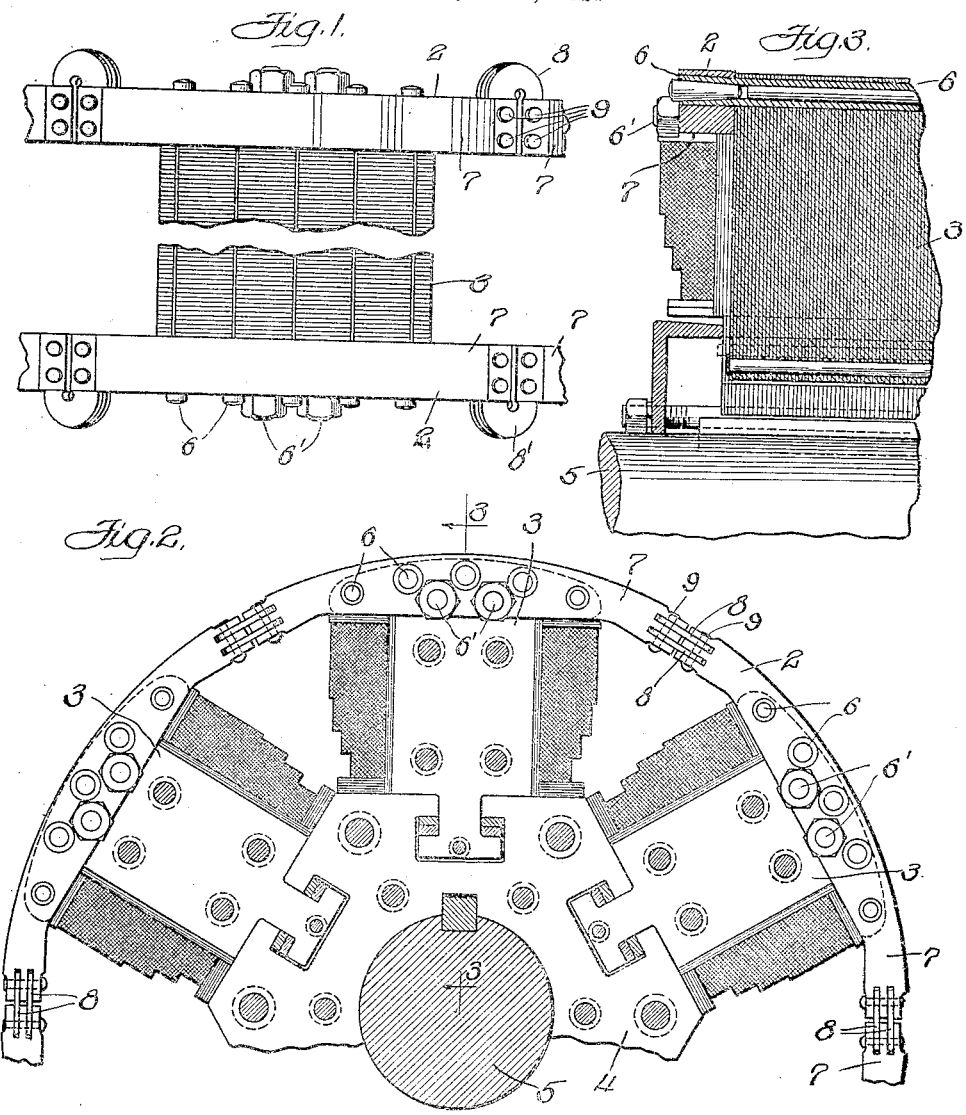

1,504,145

UNITED STATES PATENT OFFICE.

GEORGE MAURICE ROTHENBERGER, OF MANSFIELD, OHIO, ASSIGNOR TO IDEAL ELECTRIC & MANUFACTURING COMPANY, OF MANSFIELD, OHIO, A CORPORATION OF OHIO.

DYNAMO-ELECTRIC MACHINE.

Application filed April 4, 1922. Serial No. 549,374.

*To all whom it may concern:*

Be it known that I, GEORGE MAURICE ROTHENBERGER, a citizen of the United States of America, and a resident of Mansfield, county of Richland, and State of Ohio, have invented a new and useful Improvement in Dynamo-Electric Machines, of which the following is a specification.

This invention relates to the structural detail of dynamo-electric machines and more especially to means for connecting the segments of a sectional end-ring for squirrel-cage windings. The main objects of the invention are to provide squirrel-cage end rings of improved form and construction; to provide such rings of a jointed character adapted to provide for ready asemblage and knock-down, and especially having an improved form of joint; to provide end ring section joints adapted to provide for expansion and contraction of the end rings relative to the associated frame parts under variations of temperature, and without impairing or varying the conductivity of the joint.

An illustrative embodiment of this invention is shown in the accompanying drawings, in which—

Figure 1 is an edgewise exterior view of a section or fragment of a squirrel-cage rotor embodying this invention.

Fig. 2 is mainly a side view of the upper half of a rotor such as shown in Figure 1, with the interior parts shown in section on a plane perpendicular to the axis of rotation.

Fig. 3 is a section on the line 3—3 of Fig. 2.

Fig. 4 is a perspective view of a U-shaped connector such as are used for joining the abutting ends of adjacent sections of the end ring.

In the construction shown in the drawings, the rotor 1 comprises mainly a squirrel cage winding 2 mounted on the outer ends of a plurality of radially disposed pole pieces 3, which in turn are secured to the central core member or frame 4 carried by the shaft 5 concentric with member 2.

The winding 2 comprises a peripheral series of groups of bars 6 and 6' set in the outer ends of the pole pieces 3, in combination with a pair of sectional end rings made up of similar sections 7 which are connected by U-shaped members 8 and bolts or rivets 9 whereby they are secured in place, so as to produce a mechanically rigid joint and a dependable and unvarying electrical connection.

For this purpose the segments 7 are spaced apart slightly at their ends so as to provide expansion clearance under rise of temperature, and the said adjacent ends are slotted to receive the ends of the U-shaped connectors 8 which are disposed in planes which are tangent to a cylindrical surface concentric with shaft 5. The resiliently yielding rounded or bowed parts 8' of the connectors are disposed outwardly as shown in Figure 1, where they are exposed to the air and serve also as ventilators. Each joint preferably includes two connectors, one spaced somewhat from the other in a radial direction as shown in Fig. 2. Each connector has a pair of holes 10 in each arm 8" to receive the bolts 9.

It has been found that sectional end rings unless provided with expansion joints, are prone to develop bad electrical connections and consequent heating or other troubles, which, however, are entirely avoided by means of the resilient U-connector here shown.

Although but one specific embodiment of this invention has been herein shown and described it will be understood that numerous details of the construction shown may be altered or omitted without departing from the spirit of this invention as defined by the following claims.

I claim:

1. In a dynamo-electric machine, a squirrel-cage end-ring comprising a plurality of segments and resilient U-shaped connectors for said segments and secured rigidly thereto, said segments having their ends slotted tangentially to receive the ends of the connectors respectively.

2. A squirrel-cage end-ring of jointed sectional character in which the adjacent ends of the several joints are provided with a tangentially disposed U-shaped connector of substantially rigid character, and radially disposed fastening means for the overlapped ends of the segments and connectors which are arranged to mutually interfit.

3. A rotor having a plurality of poles with a squirrel-cage winding carried thereby, each pole having a pair of end ring segments clamped thereto, one on each side, and a plurality of bars connecting said segments, the adjacent ends of the segments on adjacent poles having U-shaped positive electrical connectors of resilient character to accommodate expansion and contraction of the end rings under temperature variations.

4. In a squirrel-cage winding, a pair of end-ring segments subject to relative movement under variations of temperature in combination with substantially rigid U-shaped laminated connecting means having sufficient resilience to accommodate the movements induced by temperature variations, said connecting means comprising a plurality of flat thin plates slightly spaced apart.

Signed at Mansfield, O., this 30th day of March 1922.

GEORGE MAURICE ROTHENBERGER.